(12) United States Patent
Assefa et al.

(10) Patent No.: US 7,072,547 B2
(45) Date of Patent: Jul. 4, 2006

(54) WAVEGUIDE COUPLING INTO PHOTONIC CRYSTAL WAVEGUIDES

(75) Inventors: Solomon Assefa, Cambridge, MA (US); Peter Bienstman, Gent (BE); Gale S. Petrich, Arlington, MA (US); Alexei A. Erchak, Cambridge, MA (US); Steven G. Johnson, St. Charles, IL (US); Leslie A. Kolodziejski, Belmont, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 72 days.

(21) Appl. No.: 10/464,153

(22) Filed: Jun. 18, 2003

(65) Prior Publication Data

US 2004/0109644 A1 Jun. 10, 2004

Related U.S. Application Data

(60) Provisional application No. 60/389,535, filed on Jun. 18, 2002.

(51) Int. Cl.
*G02B 6/26* (2006.01)
(52) U.S. Cl. .......................................... 385/39; 385/15
(58) Field of Classification Search ................. 385/15, 385/39
See application file for complete search history.

(56) References Cited

U.S. PATENT DOCUMENTS 4,998,793 A * 3/1991 Henry et al. .................. 385/1
6,381,389 B1 4/2002 Kosaka

OTHER PUBLICATIONS

"Adiabatic theorem and continuous coupled-mode theory for efficient taper transitions in photonic crystals," Johnson et al. *Physical Review E.* 2002. vol. 66.
"Photonic Crystal Waveguides: Out-of-Plane losses and Adiabatic modal conversion," Palamaru et al. *Applied Physics Letters.* Mar. 2001. vol. 78, No. 11.
"Efficient optical coupling to Bloch waves," Rabiei et al. *Quantum Electronics and Laser Science Conference.* May 2001. Baltimore, MD.
"Adiabatic coupling between conventional dielectric waveguides and waveguides with discrete translational symmetry," Xu et al. *Optics Letters.* May 2000. vol. 25, No. 10.
"Photonic Crystal tapers for ultracompact mode conversion," Happ et al. *Optics Letters.* Jul. 2001. vol. 26, No. 14.

(Continued)

*Primary Examiner*—Jennifer Doan
(74) *Attorney, Agent, or Firm*—Gauthier & Connors

(57) ABSTRACT

A coupling element includes a first stage having a dielectric waveguide that is transitioned to a waveguide having a sequence of resonators with a fixed period. A second stage transitions the waveguide to a photonic crystal waveguide by gradually bringing closer at an angle the cladding bulk of the photonic crystal to the waveguide.

35 Claims, 7 Drawing Sheets

OTHER PUBLICATIONS

"Tapered Couplers for Efficient Interfacing Between Dielectric and Photonic Crystal Waveguides," Mekis et al. *Journal of Lightwave Technology.* Jun. 2001. vol. 19, No. 6.

"Modal Conversion with Artificial Materials for Photonic-Crystal Waveguides," Lalanne et al. *Optics Express.* Apr. 2002. Aol. 10, No. 8.

* cited by examiner

WAVEGUIDE COUPLING INTO PHOTONIC CRYSTAL WAVEGUIDES

PRIORITY INFORMATION

This application claims priority from provisional application Ser. No. 60/389,535 filed Jun. 18, 2002, which is incorporated herein by reference in its entirety.

This invention was made with government support under Grant No. DMR-9808941, awarded by NSF. The government has certain rights in the invention

BACKGROUND OF THE INVENTION

The invention relates to the field of photonic crystals, and in particular to a photonic crystal waveguide consisting of a row of reduced diameter rods in a square lattice of dielectric rods.

Photonic crystals offer interesting potential applications in integrated photonic circuits. Many proposals have been put forward where photonic crystals have been used as devices or are used to enhance the properties of other optical devices. Photonic crystal waveguides, created by including defect rows in a bulk photonic crystal, can be used to route light within a photonic chip. However, the practical use of photonic crystals is limited by how light is coupled into the photonic crystal waveguide itself. This is a significant challenge because the photonic crystal waveguides exhibit significantly different mode profiles and propagation mechanisms compared to traditional waveguides that use index confinement.

SUMMARY OF THE INVENTION

According to one aspect of the invention, there is provided a coupling element. The coupling element includes a first stage having a dielectric waveguide that is transitioned to a waveguide having a sequence of resonators with a fixed period. A second stage transitions the waveguide to a photonic crystal waveguide by gradually bringing closer at an angle the cladding bulk of the photonic crystal to the waveguide.

According to another aspect of the invention, there is provided a method of forming a coupling element. The method includes providing a first stage having a dielectric waveguide that is transitioned to a waveguide having a sequence of resonators with a fixed period. Also, the method includes providing a second stage that transitions the waveguide to a photonic crystal waveguide by gradually bringing closer at an angle the cladding bulk of the photonic crystal to the waveguide.

According to another aspect of the invention, there is provided a coupling element. The coupling element includes a first stage that transitions a photonic crystal waveguide into a waveguide by gradually diverging away at an angle the cladding bulk of the photonic crystal waveguide from the waveguide. A second stage transitions the waveguide to a dielectric element.

According to another aspect of the invention, there is provided a method of forming a coupling element. The method includes providing a first stage that transitions a photonic crystal waveguide into a waveguide by gradually diverging away at an angle the cladding bulk of the photonic crystal waveguide from the waveguide. Also, the method includes providing a second stage that transitions the waveguide to a dielectric element.

DETAILED DESCRIPTION OF THE INVENTION

Figure 1A:
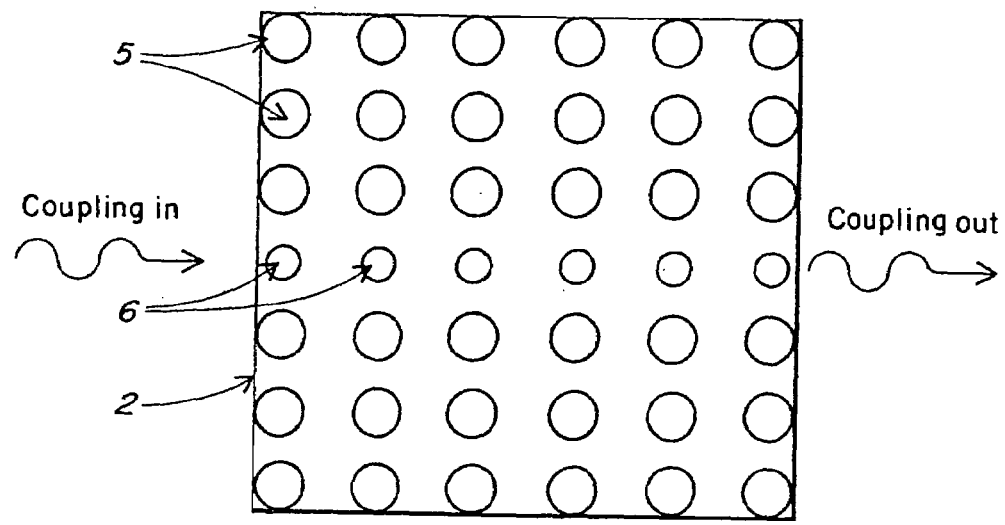
FIGS. 1A and 1B are top and perspective views, respectively, of a schematic block diagram of a photonic crystal waveguide used in accordance with the invention.
Figure 1B:
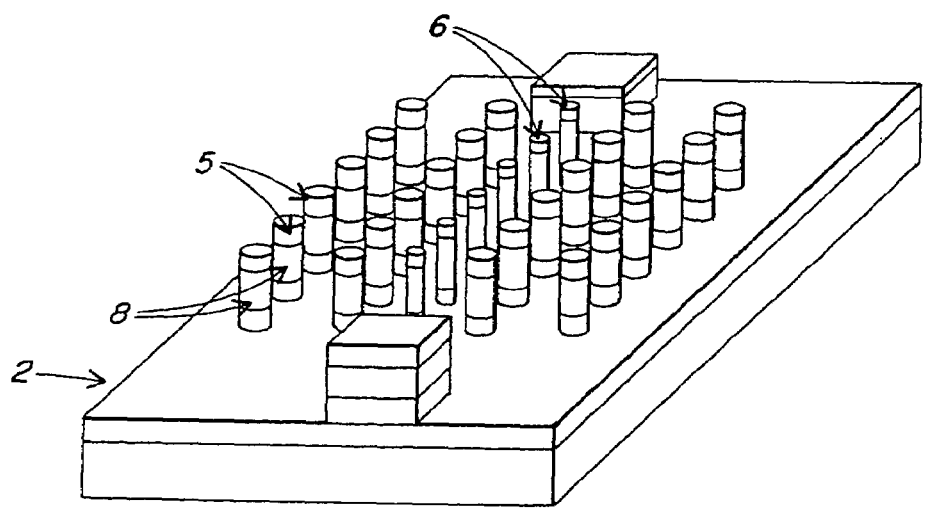

The invention provides a solution to the problem of coupling traditional waveguides to photonic crystal waveguides. Although the principles of operation are not limited hereto, the invention uses a photonic crystal waveguide 2 consisting of a row of reduced diameter rods 6 in a square lattice of dielectric rods 5, as shown in FIGS. 1A and 1B. The same coupling principle could be applied to photonic crystal waveguides created using holes. It can also be applied to photonic crystals exhibiting other crystal lattice-geometry, such as triangular or hexagonal lattice.

FIG. 1A shows a two dimensional illustration of a linear photonic crystal waveguide 2. Light is confined in the small radius row of dielectric rods 6. FIG. 1B shows a three dimensional illustration of a linear photonic crystal waveguide 2 using a two dimensional photonic crystal with index confinement in the vertical direction. The dark regions 8 indicate high index material.

The invention is key in increasing the practicality of photonic crystals. Photonic crystals are capable of guiding light linearly or around sharp corners. The efficiency of certain optical devices can also be enhanced by using the effect of photonic crystals. However, for the photonic crystals to perform these functions, light has to be coupled into them from a high index dielectric waveguide, as shown in FIG. 1A. After the enhancement effect or after guiding within the low index photonic crystal waveguide, the light has to be coupled out into another high index dielectric waveguide. The invention allows input and output coupling to happen over a large bandwidth with high efficiency. Thus, the invention paves the way for high performance on-chip optical integration by utilizing photonic crystals.

Figure 2A:
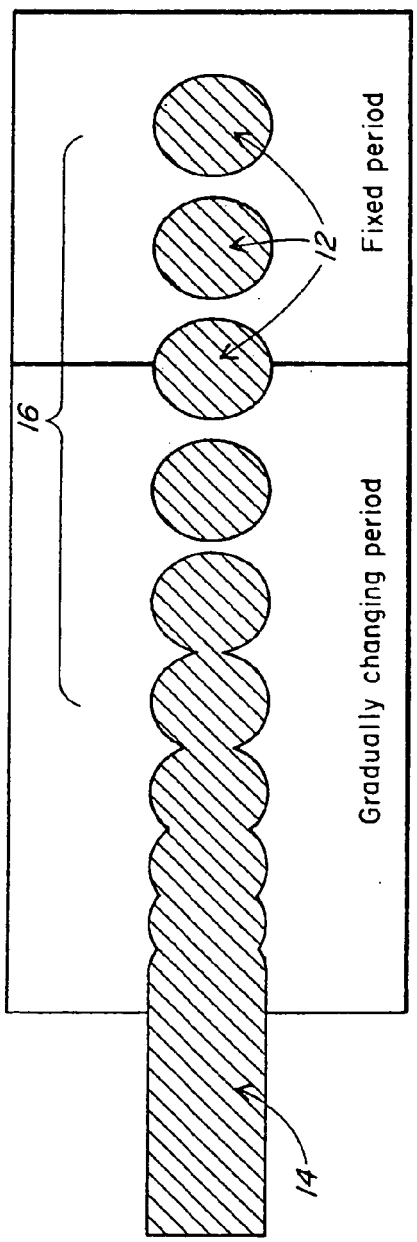
FIG. 2A is a schematic diagram of a first stage used in accordance with the invention.

The coupling structure can be broken down into two stages. In the first stage as illustrated in FIG. 2A, a smooth transition is made from a traditional index guiding dielectric waveguide 14 to a waveguide having a sequence of coupled cavity resonators 16 with a fixed period. This is done by gradually decreasing the spacing between the resonators 12, which merge to form a dielectric waveguide 14. In doing so, a transition is made between a mode profile that consists entirely of forward propagating components in the dielectric waveguide 14, and a mode profile that consists of both forward and backward propagating components in the coupled cavity waveguide 16. Note in other embodiments the shape, period, and size of the resonators 12 can vary along the structure, as well as their refractive index. The shape and size of the dielectric waveguide 14 can also be adjusted and could include a tapered edge. All of the guiding in this first stage is in high dielectric index material.

Figure 2B:
FIG. 2B is a schematic showing the modes in the upper half plane of the first stage.

FIG. 2B shows the modes in the upper half plane of the first stage. The waveguide 14 gradually changes into individual rods, which then become periodic coupled cavity waveguides 16. The lower half is symmetric to the upper half.

Figure 3:
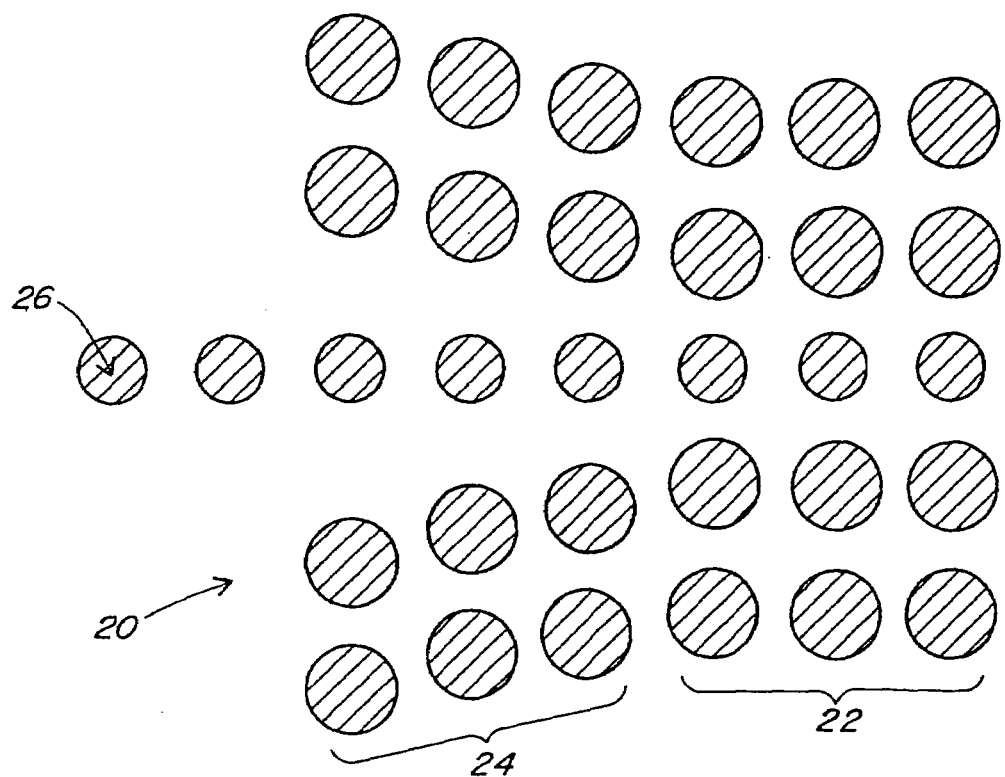
FIG. 3 is a schematic diagram of a second stage used in accordance with the invention.

In the second stage, shown in FIG. 3, the coupled cavity waveguide 26 is transformed to a photonic crystal waveguide 20, which is created with the inclusion of a bulk photonic crystal 22 in the plane. The challenge that is overcome here is the difference in guiding mechanism. In the coupled cavity waveguide 26, light is guided in a region with high effective index since the surrounding medium is air, a low index material. Moreover, the light is guided in the low effective index waveguide 26 in the photonic crystal waveguide 20 because the surrounding bulk photonic crystal 22 has a higher effective index.

The transition between these two waveguides 20 and 26 is accomplished by gradually bringing in at an angle 24 the cladding bulk photonic crystal 22 closer to the coupled cavity waveguide 26, which transitions to the photonic crystal waveguide 20. The adiabatic introduction of the photonic crystal reduces reflections at the edges and Fabry-Perot resonance in the structure. In other embodiments, the shape, size, and positions of the rods within the photonic crystal can vary along the structure, as well as their refractive index. The angle at which the bulk photonic crystal 22 approaches the defect rods can also vary within a range.

Figure 4:
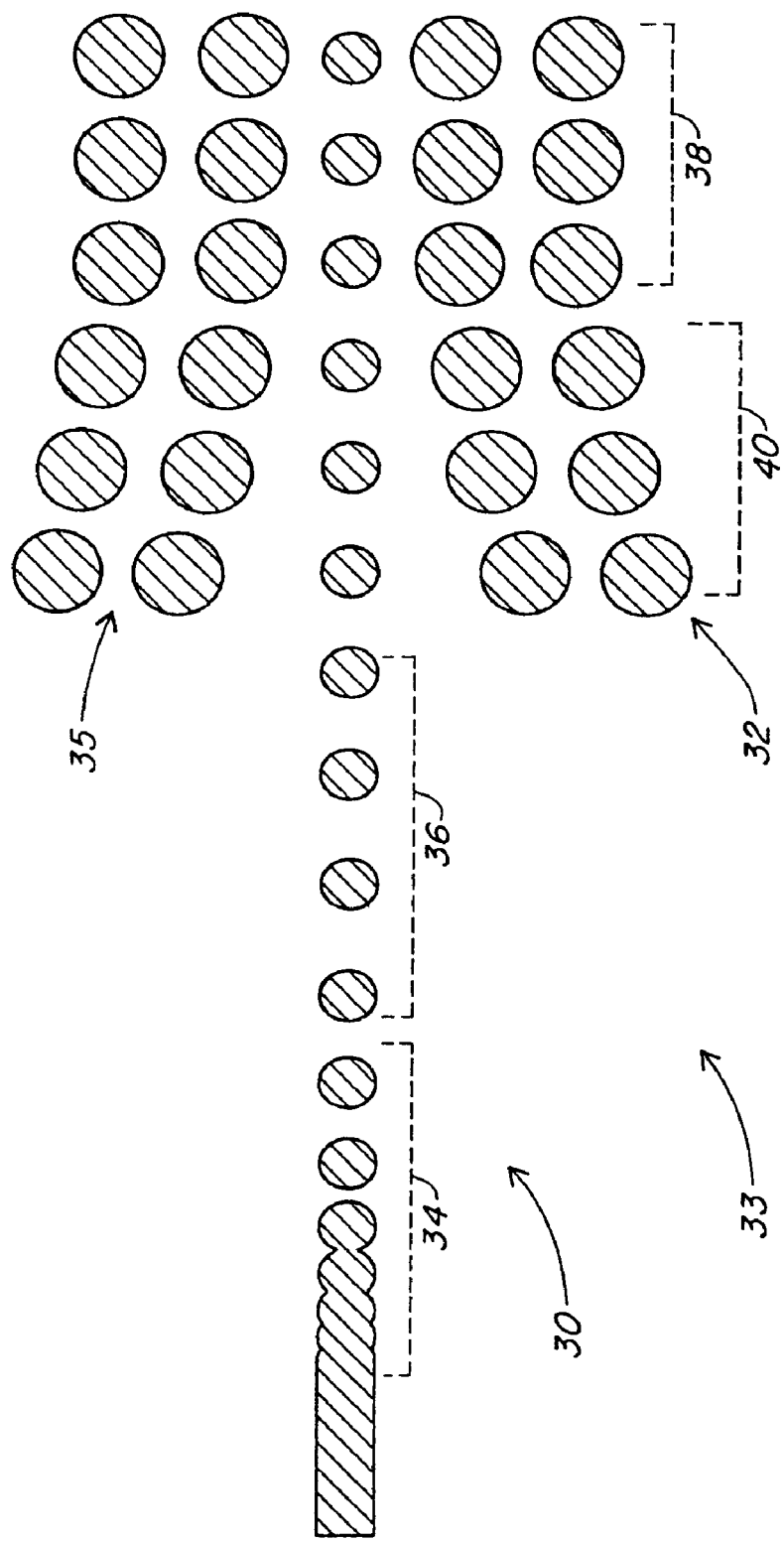
FIG. 4 is a schematic diagram combining the first and second stages of the invention.

When the first 30 and second 32 stages are combined, they can form an efficient coupling mechanism 33 into a linear photonic crystal waveguide 35, as shown in FIG. 4. As discussed in FIGS. 2A and 2B, the first stage 30 includes a smooth transition from a traditional index guiding dielectric waveguide 34 to a waveguide having a sequence of coupled cavity resonators 36 with a fixed period. The second stage 32 includes a bulk photonic crystal 38 having a selective number of rods. In addition, the second stage 32 includes periodic rods that gradually approach the defect 40, as discussed with reference to FIG. 3.

Figure 5:
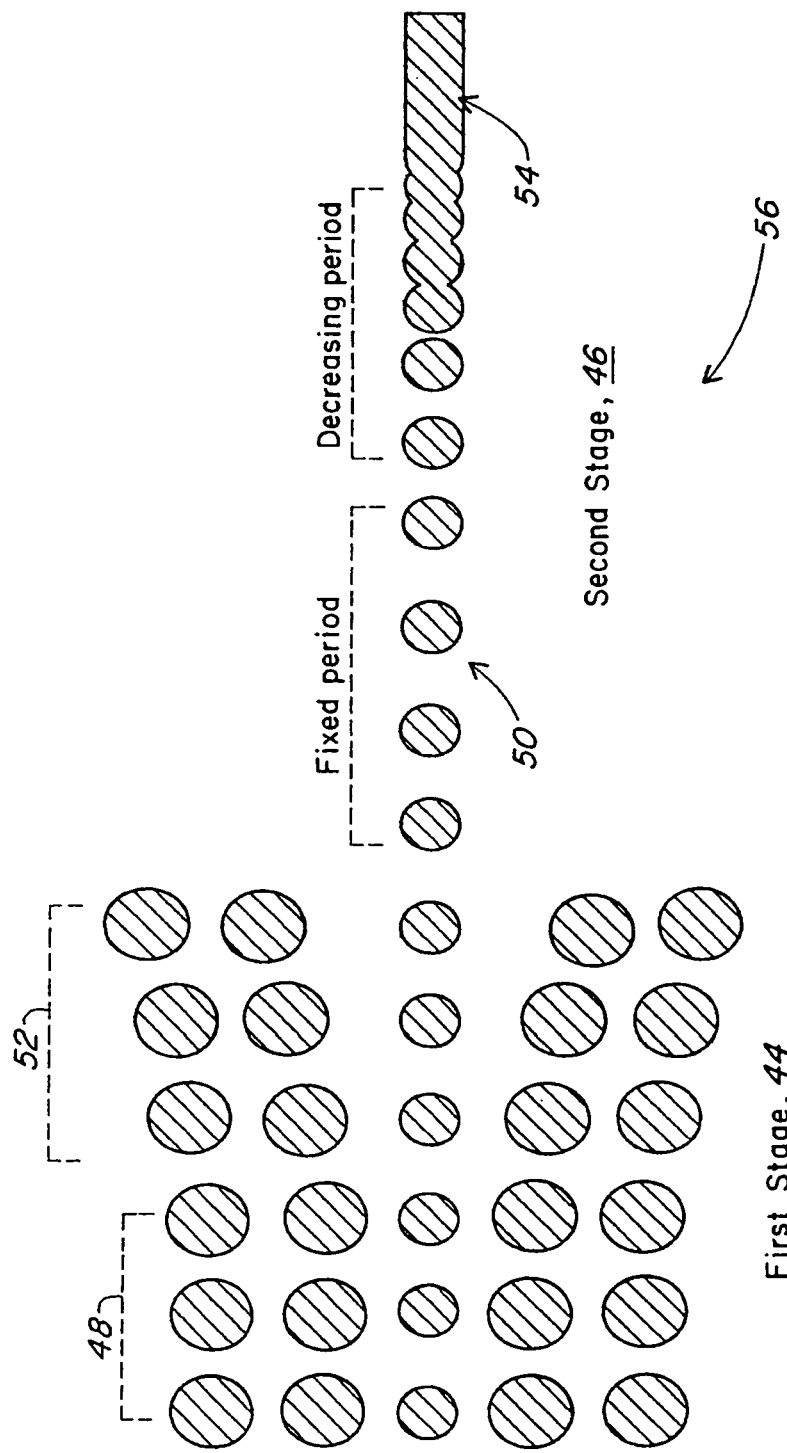
FIG. 5 is a schematic diagram illustrating output coupling from a photonic crystal waveguide to a conventional guide waveguide.

By time reversal, the output coupling 56 is similar to the input coupling 33. In the first stage 44, the photonic crystal waveguide 48 is transformed into a coupled cavity waveguide 50, as shown in FIG. 5. This is achieved by making the cladding photonic crystal 52 diverge away from the waveguide 50 at an angle. This transition guides the light from the low index photonic crystal waveguide region 52 to a high index coupled cavity waveguide 50. This adiabatic transition once again reduces reflections at the edge of the photonic crystal. In the second stage 46, the coupled cavity waveguide 50 is transformed into a conventional index guiding waveguide 54 by gradually reducing the period over a large distance, thus making the cavities merge to form a waveguide.

Figure 6:
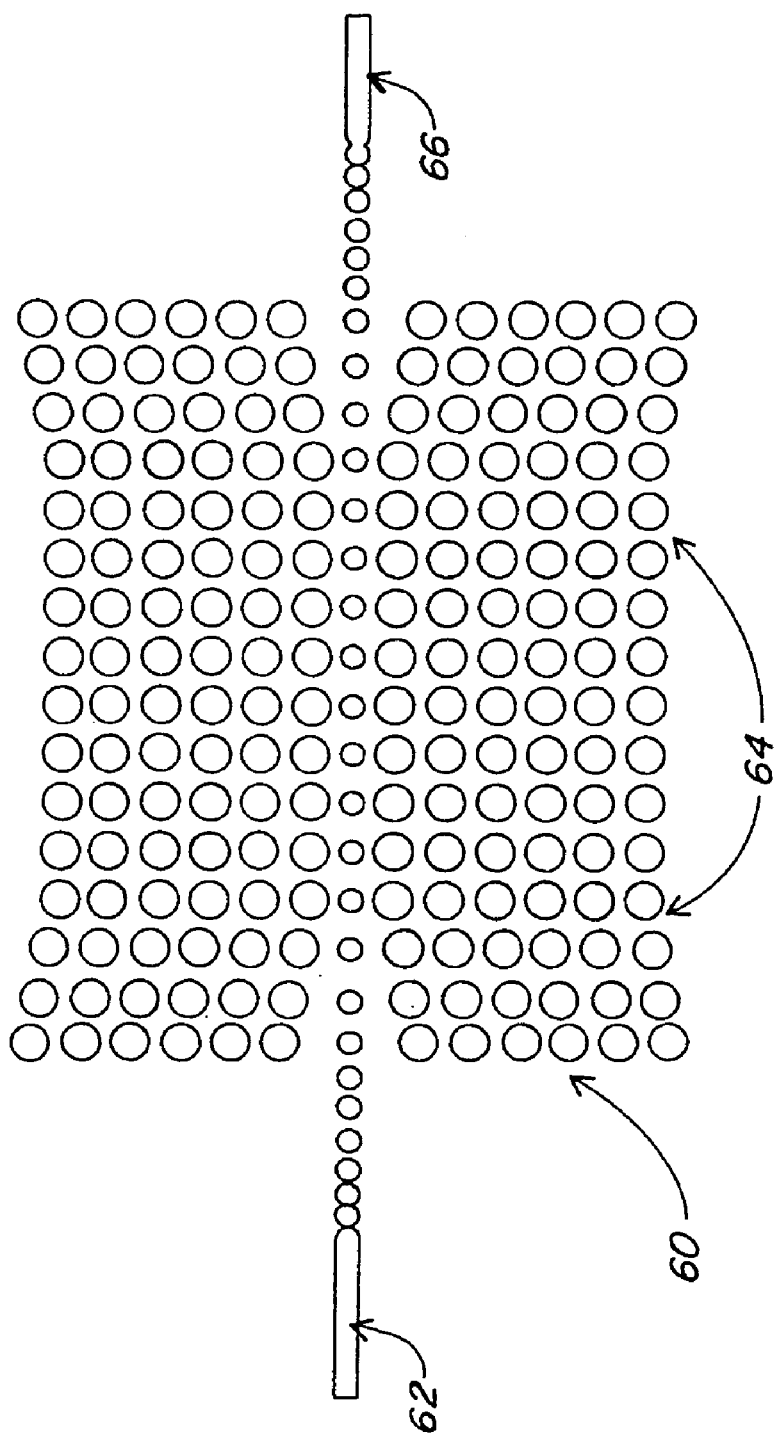
FIG. 6 is a schematic diagram illustrating a structure with input coupling from an index-guided waveguide and output coupling to another index-guided waveguide.

The combination of the input coupling 33 and the output coupling 56 is illustrated in FIG. 6. This combination provides a complete structure 60 with input coupling from an index-guided waveguide 62, the photonic crystal waveguide defects 64, and the output coupling to an index guided waveguide 66.

In the prior art, tapered waveguides have been used to couple light into photonic crystal waveguides. In these structures, the dielectric waveguide is tapered to the size of the defect waveguide over several lattice constants. This approach implements transformation of the dielectric waveguide mode to the photonic crystal waveguide mode by decreasing the modal confinement and by matching the mode profile to that of the photonic crystal waveguide. Even though this approach tries to accomplish mode matching, it doesn't succeed completely. The approach suffers from Fabry-Perot reflections from the edges of the crystal, which make the transmission dependent on frequency and waveguide length.

The tapered waveguide technique and other coupling approaches suffer from a high loss. Moreover, The tapered waveguide technique has unreliable transmission due to Fabry-Perot reflection from the edges of the input and output coupling dielectric waveguides. As a result, the transmission photonic crystal becomes dependent on the length of the waveguide; as the waveguide becomes longer, more Fabry-Perot fringes are observed in the transmission.

Figure 7:
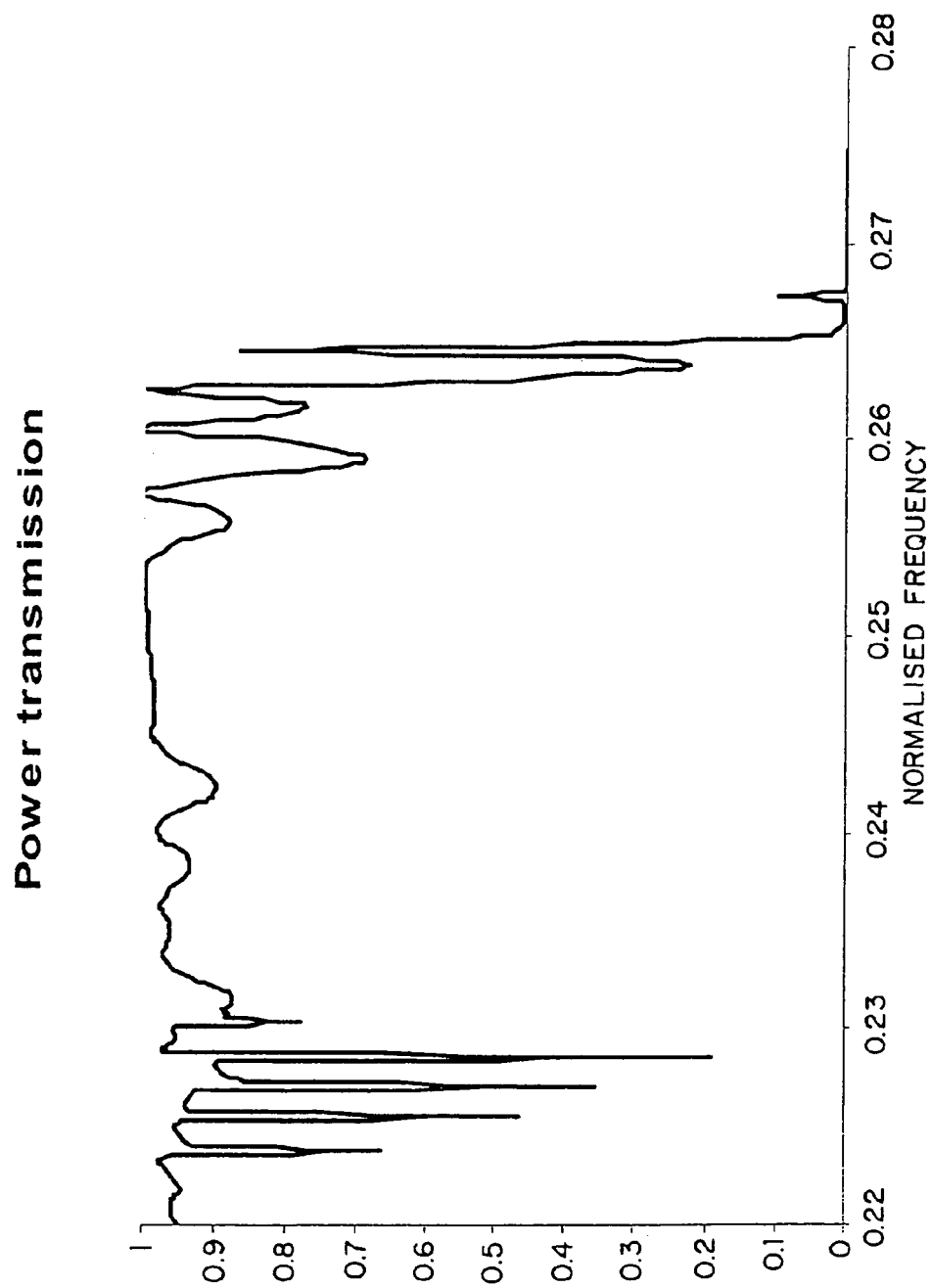
FIG. 7 is a graph demonstrating power transmission through the structure shown in FIG. 4.

The invention is configured such that transition occurs from forward propagating modes to the forward and backward propagating modes in the first stage of the design. The gradual introduction of the bulk photonic crystal also makes this approach effective. In addition, this approach minimizes reflection by eliminating the existence of an abrupt photonic crystal junction (vertical wall) that has the same size as the coupled cavity waveguide. Previous coupling approaches to this type of photonic crystal waveguide have not demonstrated a nearly 100% coupling efficiency that has been calculated in 2D simulations of this invention as shown in FIG. 7.

Furthermore, the invention uses two inventive concepts. Until now, designs that have been proposed use only mode profile matching in order to couple to photonic crystals. The invention, however, is based on the realization that the Bloch modes in the photonic crystal waveguide have both a forward and backward propagating component. This implies that it is necessary to adiabatically convert a forward propagating component in a conventional index contrast waveguide, into a combination of forward and backward propagating components prior to coupling to a photonic crystal defect waveguide. In order to couple out of a photonic crystal waveguide, the forward and backward propagating components are adiabatically converted into a forward propagating component that propagates within the conventional waveguide. The given preliminary designs implemented achieve high efficiency coupling over a large bandwidth Although the present invention has been shown and described with respect to several preferred embodiments thereof, various changes, omissions and additions to the form and detail thereof, may be made therein, without departing from the spirit and scope of the invention.

What is claimed is:

1. A coupling element comprising:
   a first stage having a smooth transition from a traditional index guiding dielectric waveguide to a waveguide having a sequence of resonators with a fixed period; and
   a second stage that transitions said waveguide to a photonic crystal waveguide by gradually bringing closer at an angle the cladding bulk of said photonic crystal to said waveguide.

2. The coupling element of claim 1, wherein said resonators convert said forward propagating components to a mode that has both forward and backward propagating components.

3. The coupling element of claim 1, wherein said first stage comprises high index material relative to its surrounding.

4. The coupling element of claim 1, wherein said second stage comprises periodic rods that gradually approach the defect of said photonic crystal waveguide.

5. The coupling element of claim 1, wherein said photonic crystal waveguide comprises both a forward and backward propagating component.

6. The coupling element of claim 1, wherein said resonators comprise a coupled cavity waveguide.

7. The method of claim 6, wherein said resonators comprise a coupled cavity waveguide.

8. The coupling element of claim 1, wherein said waveguide is formed using holes.

9. The coupling element of claim 8, wherein said waveguide is formed using holes.

10. The coupling element of claim 1, wherein said photonic crystal waveguide is formed using holes.

11. A method of forming a coupling element comprising
providing a first stage having a smooth transition from a traditional index guiding dielectric waveguide to a waveguide having a sequence of resonators with a fixed period; and
providing a second stage that transitions said waveguide to a photonic crystal waveguide by gradually bringing closer at an angle the cladding bulk of said photonic crystal to said waveguide.

12. The method of claim 11, wherein said resonators convert said forward propagating components to a mode that has both forward and backward propagating components.

13. The method of claim 11, wherein said first stage comprises high index material relative to its surrounding.

14. The method of claim 11, wherein said second stage comprises periodic rods that gradually approach the defect of said photonic crystal waveguide.

15. The method of claim 11, wherein said photonic crystal waveguide comprises both a forward and backward propagating component.

16. The method of claim 11, wherein said waveguide is formed using holes.

17. The method of claim 11, wherein said photonic crystal waveguide is formed using holes.

18. A coupling element comprising:
a first stage that transitions a photonic crystal waveguide into a waveguide having a sequence of resonators with a fixed period by gradually diverging away at an angle the cladding bulk of said photonic crystal waveguide from said waveguide; and
a second stage that comprises a smooth transition from said waveguide to a dielectric waveguide.

19. The coupling element of claim 18, wherein said resonators convert the forward and backward propagating components to a mode that has a forward propagating components.

20. The coupling element of claim 18, wherein said second stage comprises high index material relative to its surrounding.

21. The coupling element of claim 18, wherein said first stage comprises periodic rods that gradually approach the defect of said photonic crystal waveguide.

22. The coupling element of claim 18, wherein said photonic crystal waveguide comprises both a forward and backward propagating component.

23. The coupling element of claim 22, wherein said resonators comprise a coupled cavity waveguide.

24. The coupling element of claim 18, wherein said photonic crystal waveguide is formed using holes.

25. The coupling element of claim 18, wherein said waveguide is formed using holes.

26. A method of forming a coupling element comprising:
providing a first stage that transitions a photonic crystal waveguide into a waveguide by gradually diverging away at an angle the cladding bulk of said photonic crystal waveguide from said waveguide; and
providing a second stage that comprises a smooth transition from said waveguide to a dielectric waveguide.

27. The method of claim 26, wherein said resonators convert said forward and backward propagating components to a mode that has forward propagating components.

28. The method of claim 26, wherein said second stage comprises high index material relative to its surrounding.

29. The method of claim 26, wherein said first stage comprises periodic rods that gradually approach the defect of said photonic crystal waveguide.

30. The method of claim 26, wherein said resonators comprise a coupled cavity waveguide.

31. The method of claim 26, wherein said photonic crystal waveguide comprises both a forward and backward propagating component.

32. The method of claim 26, wherein said waveguide is formed using holes.

33. The method of claim 26, wherein said photonic crystal waveguide is formed using holes.

34. A coupling element comprising:
an input coupling element comprising a first stage having a first dielectric waveguide that is transitioned to a waveguide having a sequence of resonators with a fixed period and a second stage that transitions said waveguide to a photonic crystal waveguide by gradually bringing closer at an angle the cladding bulk of said photonic crystal waveguide to said waveguide; and
an output coupling element comprising a third stage that transitions said photonic crystal waveguide into said waveguide by gradually diverging away at an angle the cladding bulk of said photonic crystal waveguide from said waveguide and a fourth stage that transitions said waveguide to a second dielectric element.

35. The coupling element of claim 34, wherein said photonic crystal waveguide is formed using holes.

* * * * *